(12) United States Patent
Duggan (10) Patent No.: US 7,586,976 B1
(45) Date of Patent: Sep. 8, 2009

(54) INITIAL RANGING DETECTION FOR OFDMA SYSTEMS

(75) Inventor: Jason Duggan, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 624 days.

(21) Appl. No.: 11/366,387

(22) Filed: Mar. 3, 2006

(51) Int. Cl.
*H04L 27/30* (2006.01)

(52) U.S. Cl. .................. 375/144; 375/142; 375/148; 375/346; 375/354; 370/453; 370/461; 370/503

(58) Field of Classification Search ............ 375/142, 375/144, 148, 149, 340, 343, 346, 354; 370/329, 370/441, 442, 453, 461–462, 503; 455/502
See application file for complete search history.

(56) References Cited

U.S. PATENT DOCUMENTS 7,324,437 B1 * 1/2008 Czylwik et al. .......... 370/210

2004/0062317 A1 * 4/2004 Uesugi et al.
2005/0286465 A1 * 12/2005 Zhuang

* cited by examiner

*Primary Examiner*—Dac V Ha
(74) *Attorney, Agent, or Firm*—Ogilvy Renault LLP (57) ABSTRACT

An initial ranging detection for an orthogonal frequency division multiple access (OFDMA) wireless communication system entails removing data sub-carriers from samples of an OFDMA signal in order to suppress inter-carrier interference (ICI) between the data sub-carriers and initial ranging sub-carriers, coherently summing the resulting samples to boost signal energy, and applying a sliding window FFT to the coherently summed samples for correlating each result of the sliding window FFT with each one of a set of predetermined codes. The suppression of ICI is done by removing the cyclic prefix, performing an FFT to transform to the frequency domain whereupon the initial ranging sub-carriers are zeroed. An IFFT is then performed to return to the time domain. The cyclic prefix is then added and the new samples are subtracted from the originally received samples. The resulting samples are free of ICI and can then be coherently summed to boost signal energy.

15 Claims, 9 Drawing Sheets

INITIAL RANGING DETECTION FOR OFDMA SYSTEMS

CROSS-REFERENCE TO RELATED APPLICATIONS

This is the first application filed for the present invention.

TECHNICAL FIELD

The present invention relates in general to orthogonal frequency division multiple access (OFDMA) and, in particular, to initial ranging detection for OFDMA.

BACKGROUND OF THE INVENTION

In order for OFDMA systems to work properly on the uplink, the signals transmitted by the multiple mobile subscriber (MS) terminals within the system must arrive at the base station (BS) synchronously. An initial ranging process is performed to achieve an initial synchronization to the system and then a periodic ranging is performed to track and maintain the synchronization.

In the process of initial ranging, the first step once a mobile subscriber terminal joins the system is to first acquire the downlink timing of the system. Generally the mobile subscriber does this by synchronizing to a preamble signal transmitted by the base station on the downlink. The mobile subscriber then transmits a special signal referred to as an initial ranging transmission. It transmits this signal with respect to its acquired downlink timing. The base station will search for the initial ranging transmissions. This is a multiple access situation where multiple mobile subscriber terminals may be trying to access the system and the base station is unaware that any of the terminals are transmitting. The search will not only detect if an MS is present but will also allow the base station to estimate the range, or the distance, of the mobile subscriber with respect to the base station. This information is communicated to the mobile subscriber which will then adjust the timing of its following transmissions such that they are received synchronously with all of the other mobile subscriber terminals in the system. Note that if the detection process fails the mobile subscriber will wait a set period of time and re-transmit with more power.

In OFDMA systems, ranging is used to achieve synchronization of mobile subscriber (MS) terminals on the uplink. Once a mobile subscriber (e.g. a cell phone or other wireless device) has acquired the downlink timing of the system, the mobile subscriber generates an initial ranging transmission. The mobile subscriber transmits with respect to its acquired downlink timing. The delay of the signal received at the base station (BS) with respect to its reference time (which is generally GPS-derived) will correspond to the round-trip-delay (RTD) of a signal traveling between the base station and mobile subscriber.

The initial ranging transmission has a particular structure in both the time and frequency dimensions. The IEEE 802.16 standard, which is hereby incorporated by reference, defines an initial ranging transmission as occurring over 2 or 4 OFDMA symbols. This patent disclosure will adopt the 2 OFDMA symbol option although it is a straightforward generalization to the 4 OFDMA symbol case. The mobile subscriber chooses a code of length 144 bits which it transmits as BPSK symbols over 144 sub-carriers that are distributed across the frequency dimension. The code is randomly chosen from a set of possible codes.

Figure 1:
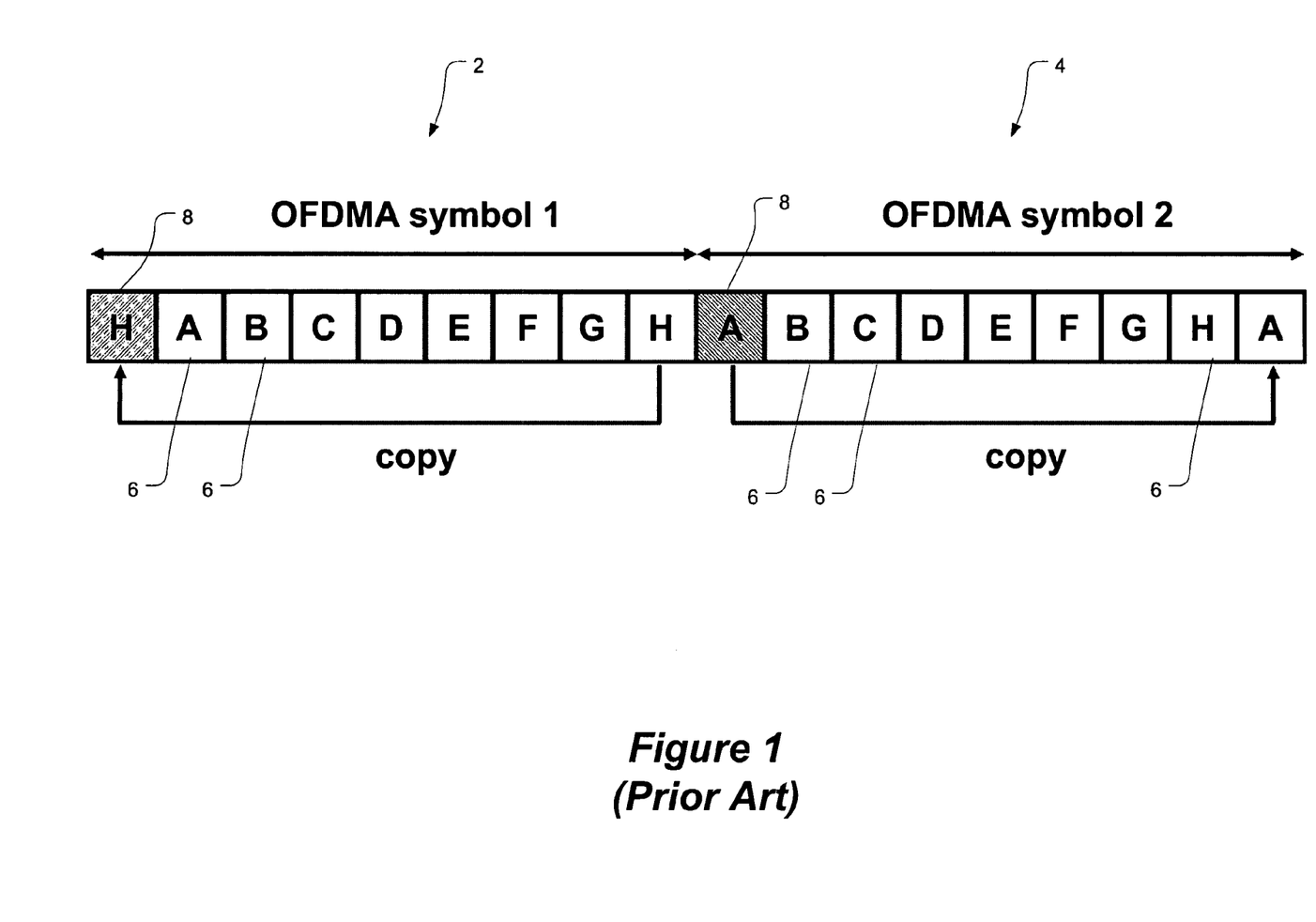
FIG. 1 is a schematic depiction of a time-domain structure of the initial ranging transmission in accordance with the prior art.

FIG. 1 shows the time-domain structure of the initial ranging transmission in a situation where the cyclic prefix (CP) of the OFDM symbol is chosen to be $1/8^{th}$ of the useful OFDM symbol. FIG. 1 shows how, in the time domain, the samples 6 of the initial ranging transmission are copied from the first OFDMA symbol 2 to create both the cyclic prefix 8 and the second OFDMA symbol 4 with the $2^{nd}$ OFDMA symbol structured in such a way that it is phase continuous with respect to the $1^{st}$ OFDMA symbol. Of particular interest is the fact that there is a periodicity in the signal (due to the phase continuity) with a period of the FFT size.

The base station performs signal processing on its received signal to detect any initial ranging transmissions over the set of possible codes and over a search window of possible delays. The search window size corresponds to the cell size. The goal of the base station is to detect the transmission from any mobile subscriber that is transmitting an initial ranging code and to detect the range of the user. A good detector will be able to detect successfully at a low signal-to-noise ratio (SNR) and under a wide variety of possible channel conditions. The cost of not detecting an initial ranging transmission is that the mobile subscriber will need to re-transmit with a higher power some time later. This re-transmission adds interference to the system as well as increasing the time required for the mobile subscriber to enter the system.

As with any detection problem, false detections are possible and should be minimized. Generally, the cost of a false detection is some downlink control channel bandwidth used to signal to the mobile subscriber its ranging adjustment. Eventually, the base station will recognize that a false detection has occurred when no response is received from a mobile subscriber.

The detection must occur in the presence of several impairments. First there is additive noise. Second, the ranging transmission will be affected by the multi-path environment of the wireless channel. Finally, the ranging transmission will experience interference. Two such sources of interference are the initial ranging transmissions of other mobile subscriber terminals and simultaneous data transmissions from other mobile subscriber terminals. This interference can be significant as the orthogonality of the OFDMA signal structure is lost when the signals are received asynchronously (which they will be for the initial ranging transmission). This interference is referred to as inter-carrier interference (ICI).

Figure 2:
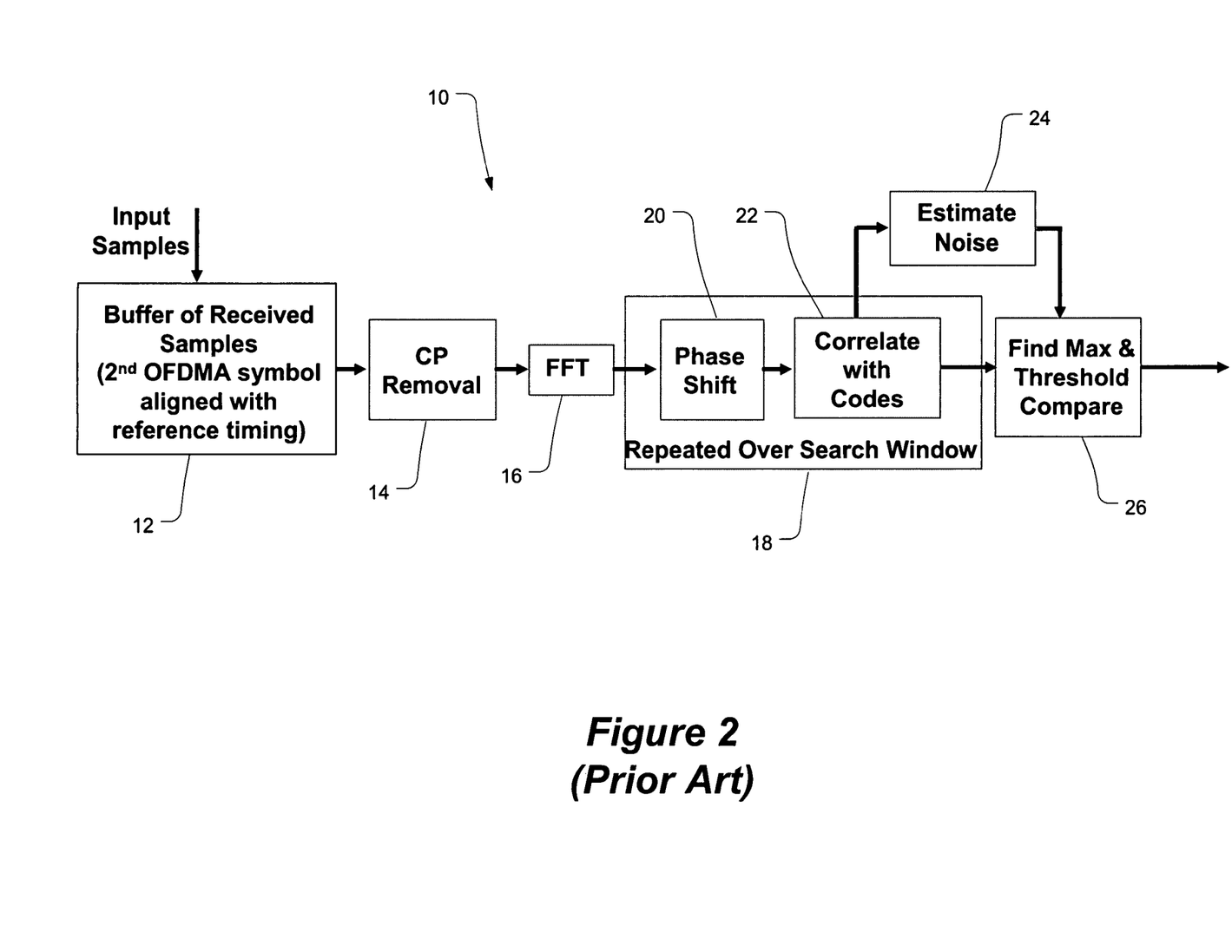
FIG. 2 is a block diagram of a prior-art method of performing initial ranging detection.

As shown in FIG. 2, the prior-art method 10 of performing initial ranging detection involves the following three steps. After samples are received into the buffer 12, the first step is to remove the cyclic prefix (CP) 14 and then perform FFTs 16 aligned with the reference data timing. The output is:

$$\alpha(k) = C \sum_{n=0}^{N_{FFT}-1} r(n) \cdot e^{-j2\pi kn/N_{FFT}}$$

where,

C is a scaling factor, $N_{FFT}$ is the FFT size, r(n) is the received sample with index n=0 corresponding to the first sample after the CP, k is the FFT output bin (i.e. sub-carrier index).

Figure 3:
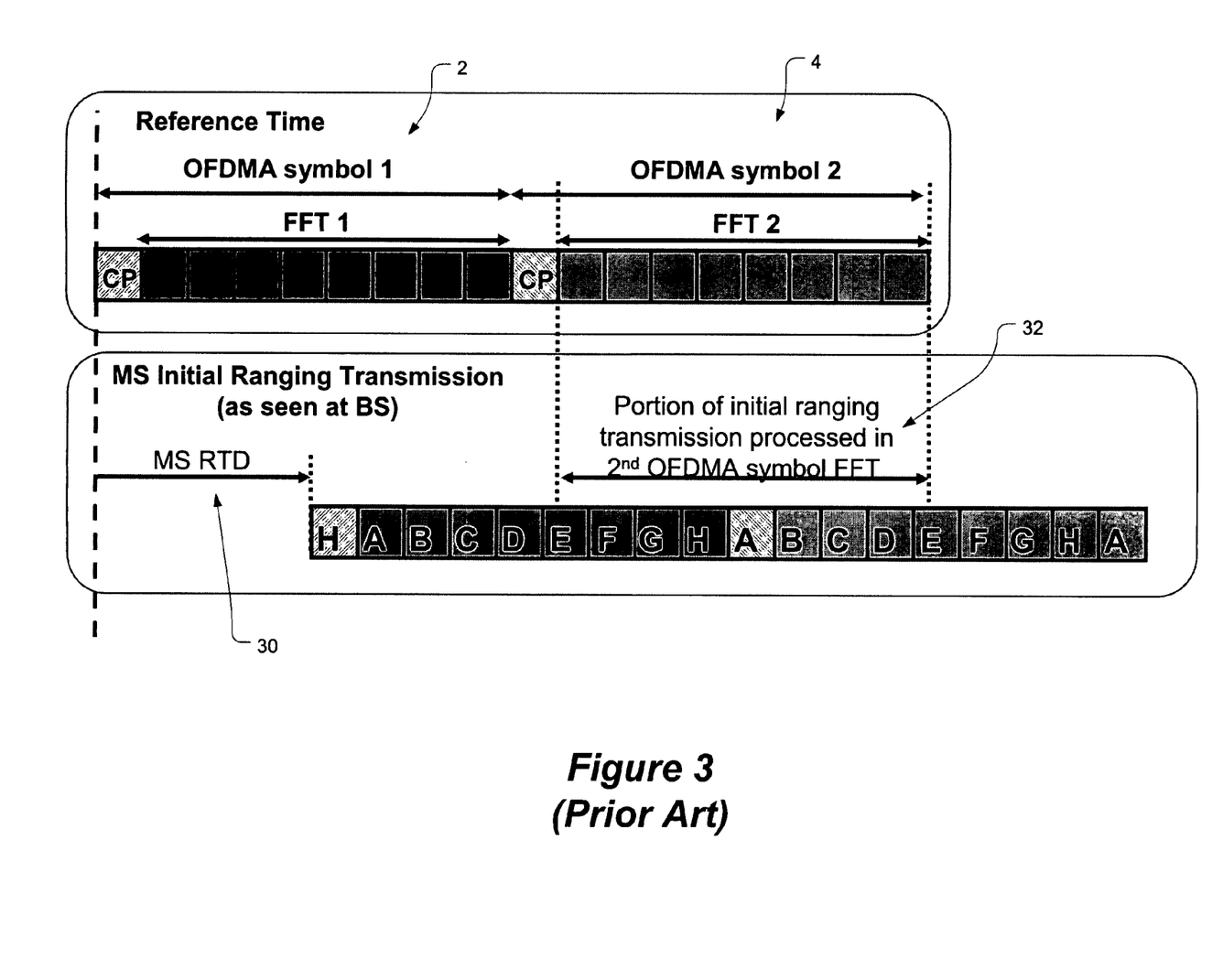
FIG. 3 is an schematic depiction of the FFT processing of the portion of the initial ranging transmission that is aligned with the second OFDMA symbol, in accordance with the prior art.

The second step of this prior-art method is to take the output of the $2^{nd}$ FFT and select the initial ranging sub-carriers for further processing. As shown in FIG. 3, the initial ranging transmission is offset by a delay equal to the mobile subscriber's round-trip delay (MS RTD 30), so that the portion 32 of the initial ranging transmission processed in the FFT corresponding to the $2^{nd}$ OFMDA symbol would encompass a portion of the $1^{st}$ OFDMA symbol and a portion of the $2^{nd}$ OFDMA symbol.

The sub-carriers are distributed across the frequency dimension with the indices $k \in (0, \ldots, N_{FFT}-1)$. Due to the time-domain structure of the initial ranging transmission, there will always be a full OFDMA symbol's worth of transmitted samples to process with the samples circularly shifted in time which will correspond to a phase shift between consecutive sub-carriers. Also, since the FFT is done over the same samples as the data, there is no inter-carrier interference from the data sub-carriers. In fact, this point is the rationale for performing the FFT over the set of samples corresponding to the $2^{nd}$ FFT. This is illustrated in FIG. 3.

The third step of this prior-art method is to use a search window 18 to perform a search across the search window of delays, which in turn is performed in three sub-steps: first, for delay d, multiply the initial ranging sub-carriers by a phase factor (phase shift 20) that depends on the sub-carrier index k and the delay d (this can also be done recursively):

$$\phi p(k,d) = \alpha(k) \cdot e^{j2\pi k(d+1) \cdot (N_{FFT}-N_g)/N_{FFT}}$$

where, $\phi(k,d)$ is the resulting phase-shifted sub-carrier value for sub-carrier k for delay d, k is the sub-carrier index of the corresponding initial ranging sub-carrier, d is the delay (in units of samples) being searched (d=0, 1, ..., $N_{search}-1$)

$N_{FFT}$ is the FFT size, and $N_g$ is the size of the guard duration (CP duration in samples).

Second, using a correlator 22, the resulting phase-shifted sub-carriers are correlated with the set of ranging codes being searched. This correlation could be done all coherently:

$$\gamma(m,d) = \left\| \sum_{n=0}^{143} \varphi(f(n),d) \cdot c_m(n) \right\|^2$$

where, $\gamma(m,d)$ is the correlation output for code m at delay d, n is an index through the code (n=0, ..., 143), f(n) is the function that describes the mapping of the code to the sub-carrier indices, $c_m(n)$ is the bit of code m at index n.

Third, the maximum correlation result is found for each code and compared against a predetermined threshold. Detection for a particular code is considered a success if the correlation result exceeds the threshold and the range is then determined to be the argument (i.e. the delay) that maximizes the correlation result. Note that the threshold is normally based on a multiple of an estimated noise level with the optimum value of the threshold determined through empirical testing or simulation. As shown in FIG. 2, a noise estimator 24 can be used with comparator logic 26 to determine if the maximum correlation result exceeds the threshold in order to declare a successful detection.

One of the shortcomings of this prior-art method is that initial ranging detection at low SNR and/or in poor channel conditions has a low probability of successful detection. As a consequence, the mobile subscriber retransmits its initial ranging transmission at a higher power, both draining the mobile's battery power and creating inter-carrier interference because the initial ranging transmission is not synchronized (i.e. not orthogonal). A technology that addresses this problem remains highly desirable.

SUMMARY OF THE INVENTION

An object of the present invention is to improve initial ranging detection of mobile subscribers at low SNR and/or in poor channel conditions. The invention provides an improved method and an improved initial ranging detector that first removes inter-carrier interference (ICI) by removing the data sub-carriers from the time-domain signal. Removal of ICI is done by removing the cyclic prefix, performing an FFT to transform to the frequency domain, zeroing the initial ranging sub-carriers, performing an IFFT to return to the time domain and adding the cyclic prefix. The resulting samples are then subtracted from the originally received (buffered) samples to generate new samples that are substantially free of ICI. Second, once the data sub-carriers have been removed, the resulting samples are coherently summed to boost the signal energy. Third, a sliding window FFT is performed and the results of the sliding FFT are then correlated with a set of predetermined codes.

Thus, an aspect of the present invention provides a method of performing an initial ranging detection for an orthogonal frequency division multiple access (OFDMA) wireless communication system. The method includes a step of removing data sub-carriers from samples of a received OFDMA signal in order to suppress effects of inter-carrier interference (ICI) between the data sub-carriers and initial ranging sub-carriers whereby resulting samples are substantially free of ICI. The method also includes a step of coherently summing the resulting samples to boost signal energy. The method also includes a step of applying a sliding window FFT to the coherently summed samples and correlating each result of the sliding window FFT with each one of a set of predetermined codes.

Another aspect of the present invention provides an initial ranging detector for detecting an initial ranging transmission of a mobile subscriber in an orthogonal frequency division multiple access (OFDMA) wireless communication system. The initial ranging detector includes a buffer for receiving and storing samples of a received OFDMA signal and a processing module for processing the samples to suppress effects of inter-carrier interference (ICI) between data sub-carriers and initial ranging sub-carriers and for subtracting the processed samples from the stored samples to generate a new set of samples wherein ICI is suppressed. The detector also includes a coherent summation block for coherently summing the new samples to boost signal energy and a search window module for performing a sliding window FFT on the new samples and for correlating results of the sliding window FFT with each one of a set of predetermined codes.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 4:
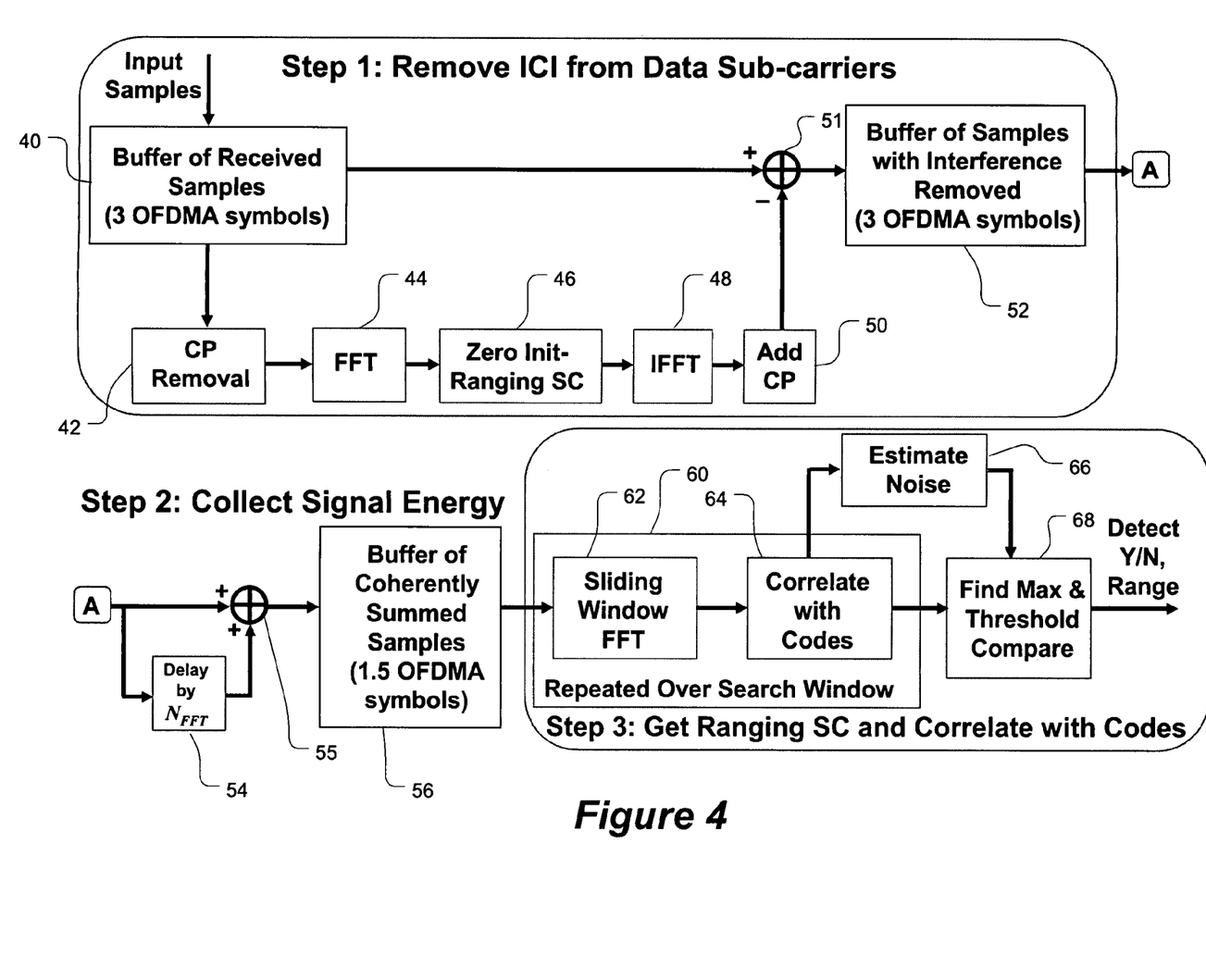
FIG. 4 is a block diagram of a method of performing initial ranging detection in accordance with a preferred embodiment of the present invention.

In accordance with a preferred embodiment of the present invention, a method of performing initial ranging detection of a mobile subscriber (MS) within an OFDMA system (within the IEEE 802.16 standard in particular) includes the three main steps depicted schematically in FIG. 4.

FIG. 4 is a block diagram illustrating a method of performing initial ranging detection for a mobile subscriber within an orthogonal frequency division multiple access (OFDMA) system in accordance with a preferred embodiment of the present invention. As shown in FIG. 4, the method includes three main steps, a first step of removing the data sub-carriers from the time-domain signal, a second step of coherently summing the samples in the time domain to gather all of the signal energy, and a third step of performing a sliding window Fast Fourier Transform (FFT), the result of which is correlated against each one of a set of predetermined codes. These three steps are described below in greater detail:

Step 1: Data Sub-Carrier Removal

The first step in the method is to remove the data sub-carriers from the time domain signal, i.e. from samples of a received OFDMA signal in order to suppress effects of inter-carrier interference (ICI) between the data sub-carriers and initial ranging sub-carriers whereby resulting samples are substantially free of ICI. This is done for a number of OFDMA symbols worth of samples. The number of OFDMA symbols this is performed for is the length of the initial ranging transmission plus the expected maximum round trip delay (RTD), expressed in samples. In this particular embodiment, the method uses 3 OFDMA symbols, although it will be readily appreciated by those of ordinary skill in the art that the number of symbols can be varied, and can be of course extending to larger cell sizes. Using 3 OFDMA symbols ensures that all signal energy is captured. Since the second OFDMA window (from base station reference) is selected and since the delay might cause a shift of up to one symbol, taking 3 OFDMA symbols ensures that all the signal energy is captured. Therefore, in the embodiment shown in FIG. 4, 3 OFMDA symbols worth of input samples are buffered in a buffer of received samples 40.

For each OFDMA symbol, the following steps are performed:

1. Remove, in the time domain, a cyclic prefix (CP) from the samples of the received OFDMA signal (at step 42, which can be implemented for example using a first filter);

2. Perform the FFT (aligned with the reference timing of the data sub-carriers) at step 44, which can be implemented for example using a second filter. This converts the time domain signal to the frequency domain signal, i.e. the various sub-carriers that contain data and initial ranging code. In other words, performing an FFT transforms the samples from the time-domain into a frequency-domain signal having initial ranging sub-carriers and data sub-carriers;

3. Zero the initial ranging sub-carriers to create a suppressed frequency-domain signal (at step 46, which can be implemented for example using a third filter);

4. Perform the IFFT to convert back from the frequency domain to the time domain (at step 48, which can be implemented for example using a fourth filter). In other words, the IFFT transforms the suppressed frequency-domain signal having only data sub-carriers to an equivalent suppressed time-domain signal; and 5. Append the cyclic prefix to reconstitute the original signal minus the initial ranging sub-carriers (at step 50, which can be implemented for example using an adder). In other words, adding the cyclic prefix to the suppressed time-domain signal creates a set of suppressed samples wherein all effects of the initial ranging sub-carriers are suppressed.

The result is a new set of time-domain OFDMA samples having only data sub-carriers. These new samples are then subtracted (at step 51, e.g. using a summation/subtraction block) from the originally received samples 40. In other words, as shown in FIG. 4, the new samples (with suppressed initial ranging sub-carriers) are subtracted from the received samples 40, the result being a buffer of samples 52 with inter-carrier interference removed. The subtraction removes the effect of data sub-carriers so that only the initial ranging information remains. In other words, subtracting the suppressed samples from buffered samples of the received signal generates a set of new samples that are substantially free of inter-carrier interference.

Steps 42, 44, 46, 48, 50, 51 can be implemented in a processing module (e.g. a cascade of filters) for processing the samples to suppress effects of inter-carrier interference (ICI) between data sub-carriers and initial ranging sub-carriers and for subtracting the processed samples from the stored samples to generate a new set of samples wherein ICI is suppressed.

Step 2: Time Domain Coherent Summing of Samples

After the samples are processed to remove ICI, the second main step entails coherently summing the resulting samples to boost signal energy.

Figure 5:
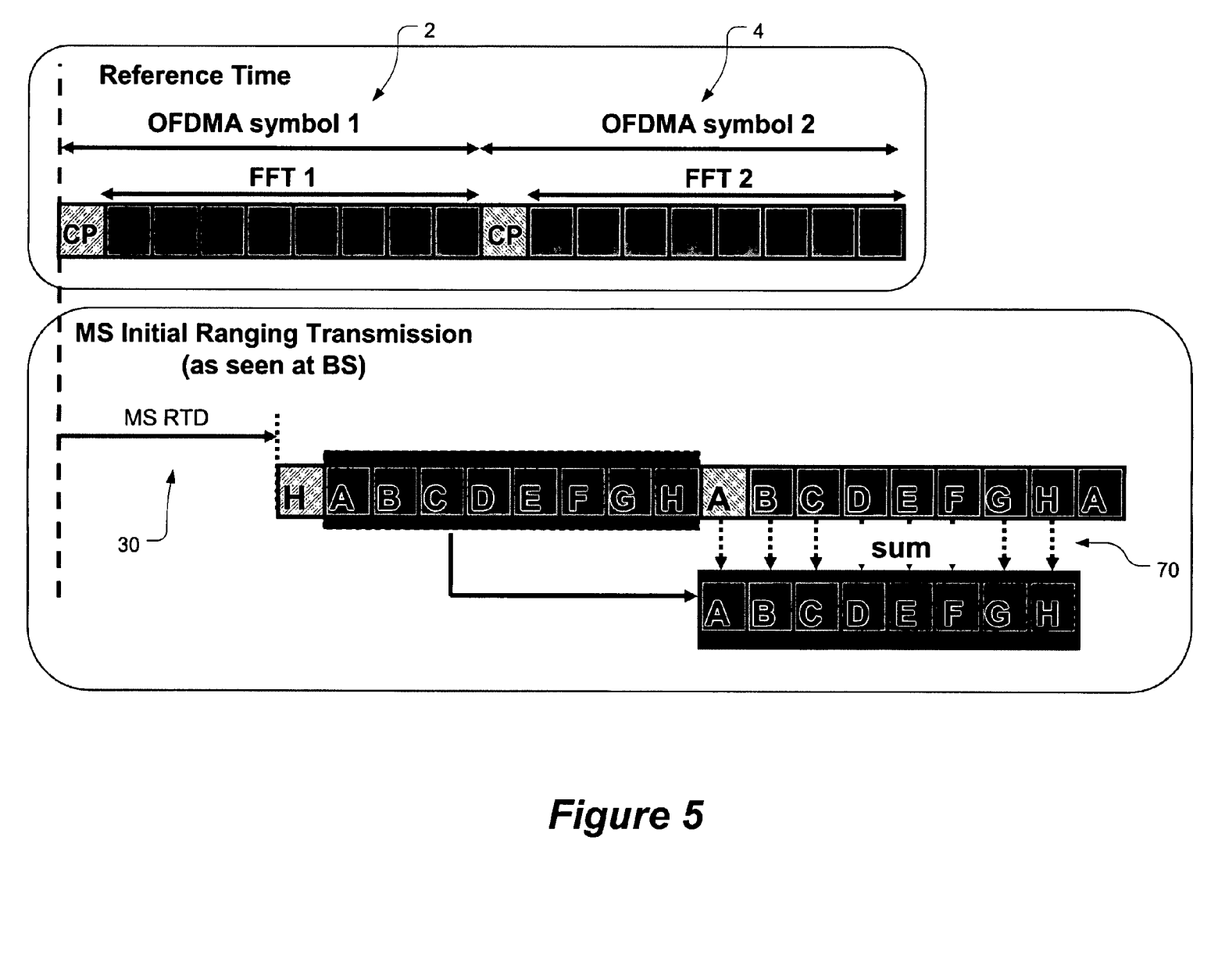
FIG. 5 is a schematic depiction of the coherent summing of samples from adjacent OFDMA symbols, in accordance with the preferred embodiment of the present invention.
Figure 6:
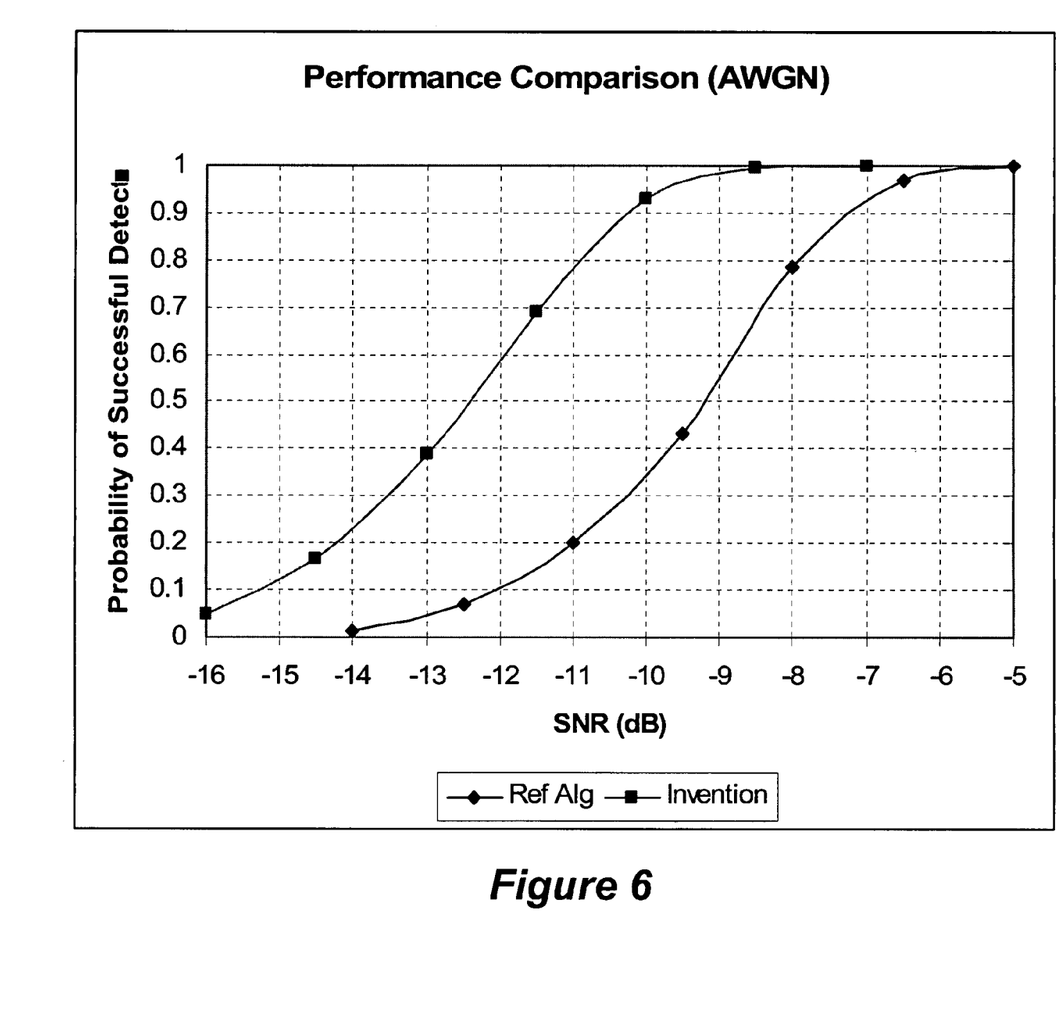
FIG. 6 is a graph plotting the probability of successful detection as a function of signal-to-noise ratio for additive white Gaussian noise (AWGN)
Figure 7:
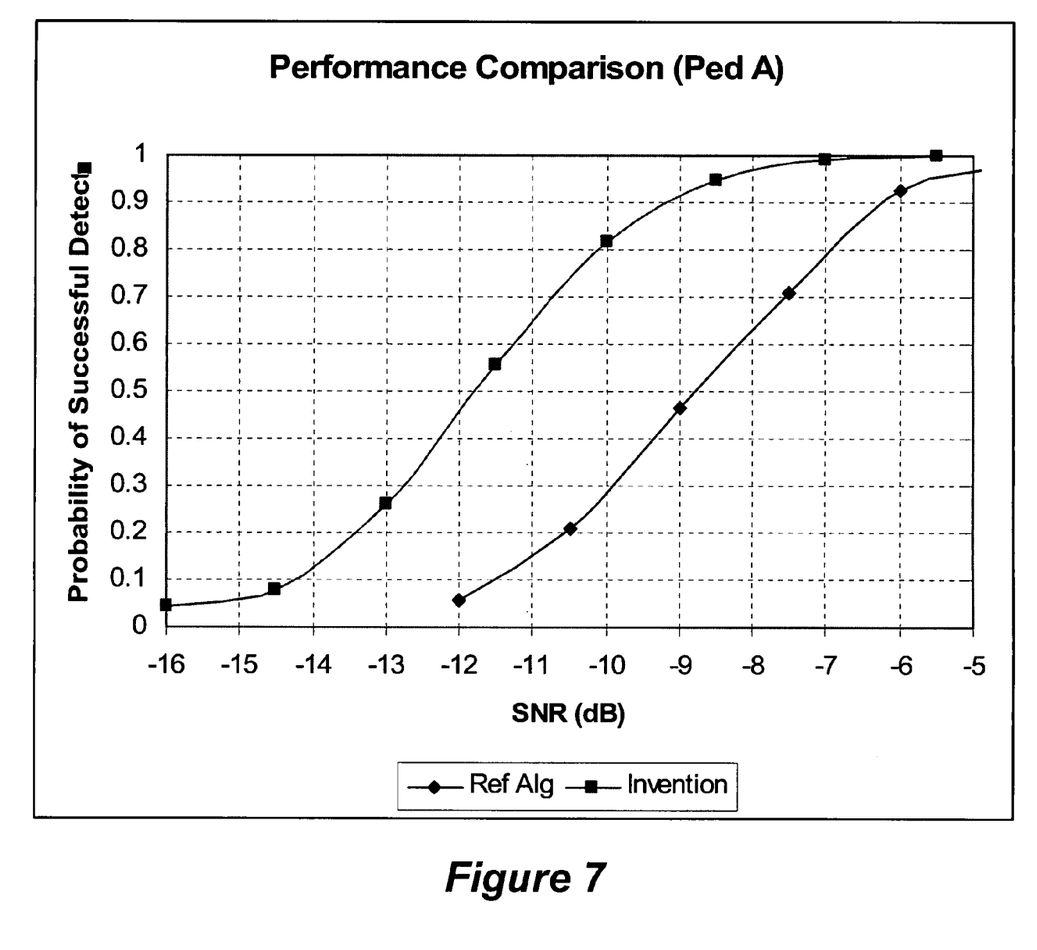
FIG. 7 is a graph plotting the probability of successful detection as a function of signal-to-noise ratio for a mobile subscriber traveling at 3 km/h.
Figure 8:
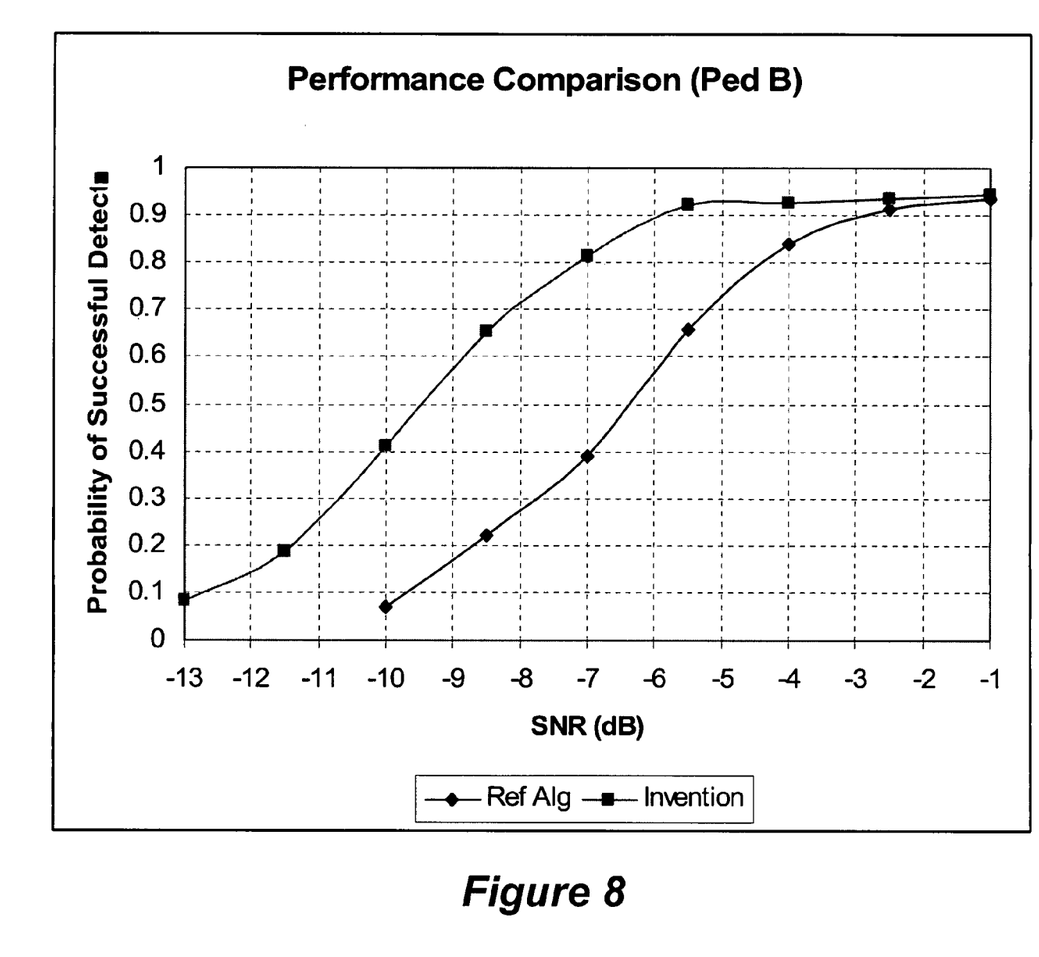
FIG. 8 is a graph plotting the probability of successful detection as a function of signal-to-noise ratio for a mobile subscriber traveling at 3 km/h.
Figure 9:
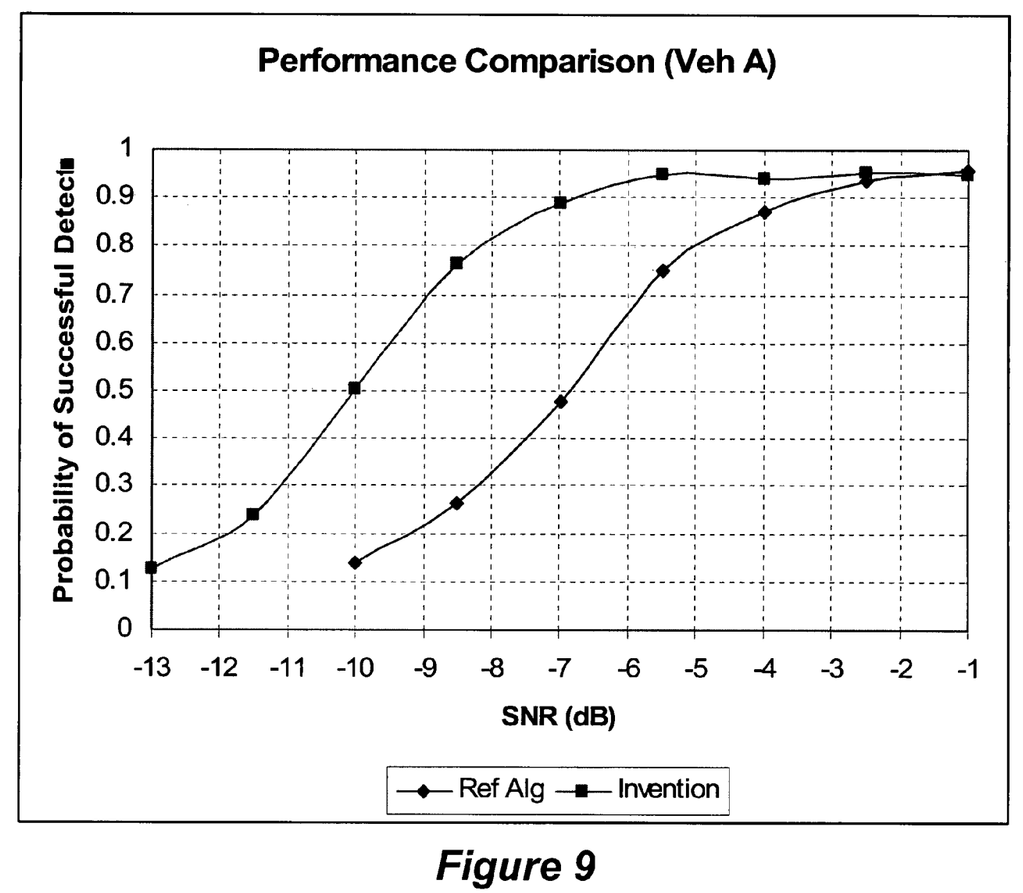
FIG. 9 is a graph plotting the probability of successful detection as a function of signal-to-noise ratio for a mobile subscriber traveling in a vehicle at 100 km/h.

With the data sub-carriers removed, the time-domain characteristics of the initial ranging transmission (as shown in FIG. 5) may now be exploited. There is a periodicity in the time-domain signal with a period of the FFT size. This step simply coherently sums time-domain samples offset by a delay equal to the FFT size ($N_{FFT}$) that is introduced by a delay block 54. In other words, the samples are coherently summed with a parallel-stream copy of the samples that are offset by the periodicity in the signal. A coherent summation block 55 coherently sums the new samples to boost signal energy. The result is an updated set of time-domain samples that is half as long as the original set of samples but which contains double the signal energy. In this example, the updated set of samples has a length of 1.5 OFDMA symbols, which are buffered in a buffer 56 as shown in FIG. 4. In other words, by doubling the energy gathered from the transmission and by first removing the ICI from the data sub-carriers, superior initial ranging detection is achieved.

Coherent summation 70 means that samples are summed vectorially in the complex plane with the result that signal strength is doubled without increasing noise. Therefore, the theoretical improvement in signal-to-noise ratio (SNR) is 3 db. Empirical results have validated the increase of 3 db in system performance.

Step 3: Sliding Window FFT and Correlation

The third main step entails applying a sliding window FFT to the coherently summed samples and correlating each result of the sliding window FFT with each one of a set of predetermined codes.

A search window 60 having a sliding window FFT 62 is used to gather all of the energy in the original delayed transmission from the mobile subscriber. The sliding window FFT 62 is simply an FFT where the window of samples used for the FFT advances by a sample for each delay considered in the search window 60. It may be computed recursively, advancing a single sample at a time. Note that a complete FFT is unnecessary. Rather, only the sub-carriers corresponding to the initial ranging sub-carriers can be updated.

In a recursive implementation, the sliding window is initiated with a complete FFT:

$$\alpha(k,0) = C \sum_{n=0}^{N_{FFT}-1} r(n) \cdot e^{-j2\pi kn/N_{FFT}}$$

where, $\alpha(k,d)$ is the output of the FFT for FFT bin (i.e. output) k, for delay d, C is a constant, $N_{FFT}$ is the FFT size, n is an index of the time domain sample (n=0, 1, ..., $N_{FFT}$−1) with n=0 corresponding to the first sample past the cyclic prefix, r(n) is the time-domain sample (after the data sub-carrier removal and time domain coherent summing of the previous steps), and k is the FFT bin (sub-carrier index).

The initial FFT is used for the correlations at delay d=0. For the following set of delays in the search window (d=1, ..., $N_{search}$−1) the FFT is updated at sub-carrier k with the recursive expression:

$$\alpha(k,d+1) = [\alpha(k,d) + C \cdot r(d+N_{FFT}) - C \cdot r(d)] \cdot e^{j2\pi k/N_{FFT}}$$

Note that this expression only needs to be updated for those values of k which correspond to the initial ranging sub-carriers.

After the sliding window FFT has been performed, the resulting initial ranging sub-carriers may be correlated with the set of predetermined ranging codes being searched (at step 64, which can be implemented, for example, using a correlator). Each of the predetermined codes is typically 144 bits in length. The correlation is performed by a brute-force searching for each one of these predetermined codes, i.e. by correlating each incremental FFT result with each of the known (predetermined) codes. This correlation can be done all coherently:

$$\gamma(m,d) = \left\| \sum_{n=0}^{143} \alpha(f(n),d) \cdot c_m(n) \right\|^2$$

where, $\gamma(m,d)$ is the correlation output for code m at delay d, n is the index through the code (n=0, ..., 143), f(n) is the function that describes the mapping of the code to the sub-carrier indices, $c_m(n)$ is the bit of code m at index n.

The correlation results are then processed to find the maximum value and to compare the maximum value to a threshold (at step 68, which can be implemented, for example, using a comparator). Detection for a particular code is considered a success if the correlation result exceeds the threshold and the range is then determined to be the argument (i.e. the delay) that maximizes the correlation result. Note that the threshold is normally based on a multiple of an estimated noise level (at step 66, which can be implemented, for example, using a noise estimator) with the optimum value of the threshold determined through empirical testing or simulation.

This method takes full advantage of all of the transmitted signal energy in the initial ranging transmission, rather than just that captured during the interval of the $2^{nd}$ OFDMA symbol as with the reference solution. In order to take advantage of the full transmitted signal energy, the invention exploits the periodicity in the time-domain structure of the initial ranging transmission by coherently summing the samples from the 2 transmitted adjacent OFDMA symbols. FIG. 5 illustrates this coherent summing of samples. Note that this coherent summing is done at all delays prior to performing the FFT operation. FIG. 5 shows this summation at the particular delay that corresponds to the mobile subscriber's round-trip delay (RTD).

Initial ranging detection is a necessary function of an OFDMA base station. This invention substantially improves the probability of successful detection of the initial ranging transmissions (i.e. at lower SNR). Performance comparisons with the reference algorithm found later in the document attest to the superior performance of the invention. The key benefits are as follows:

First, the method reduces interference to the data sub-carriers due to the reduced power required of the initial ranging transmission from the mobile subscribers and the need for fewer retry attempts. Note that the initial ranging transmissions are not synchronously received with the data sub-carriers from other mobile subscriber terminals and so they can present significant inter-carrier interference to the data sub-carriers. The reduced interference to the data sub-carriers leads directly to increased system capacity (higher throughputs, lower error rates, more users, better coverage, etc.).

Second, the method allows for successful detection of users further from the base station due to the ability to detect users with lower signal power.

Third, the method reduces system access time (due to the need for fewer retry attempts).

Fourth, the method provides savings in mobile battery usage (lower power required from the terminal transmission).

Performance Comparison

As evinced by the graphs presented in FIGS. 6 to 9, the performance of the present method of performing initial ranging detection is demonstrably superior to the prior-art technique.

In each graph, the signal-to-noise ratio (SNR) refers to the signal-to-noise ratio of the initial ranging sub-carriers. The noise referred to in this ratio is the amount of additive white Gaussian noise (AWGN) applied to the channel. Besides the addition of noise, the rest of the useful data sub-carriers from other MS terminals are occupied with the SNR of the data sub-carriers being 10 dB. The data of this interference is randomly generated with the modulation randomly varying between QPSK and 16-QAM. The data sub-carriers are in a flat channel.

The initial ranging transmissions have a channel model applied to them. Results are shown in FIGS. 6 to 9, respectively, for AWGN, as well as Pedestrian A (traveling at 3 km/h), Pedestrian B (also traveling at 3 km/h), and Vehicular A (traveling at 100 km/h) channel models. Pedestrian Channel A and B, as well as the vehicular model are industry-standard (ITU) channel models representing different propagation environments (the timing and power level of different paths, or echoes, of the signal as it travels over the air). A single mobile subscriber terminal is transmitting the initial ranging code with the range chosen randomly up to 5 km. The search window size is 512 samples and 8 initial ranging codes are searched. The codes are as defined in the IEEE 802.16e standard with UL_IDCellPermBase=0. The first code is used for the desired MS and the first 8 codes are the ones that are searched. The initial ranging transmission is assumed to occupy 2 OFDMA symbols. In all cases, the simulations were run with a range of threshold values. The threshold value that kept the average probability of false detection across all channel models and SNRs below 6% was chosen. This probability is defined here as the probability of at least 1 false detection (either on the wrong code or at the wrong range of the correct code) within the frame.

Results plotted in the graphs of FIGS. 6 to 9 represent the probability of successful detection versus the SNR for each channel model. Note that successful detection was declared if the range detected for proper code was within 2 samples of a major path with a major path defined as one which has its power within 5 dB of the largest path (in the model definition). In conclusion, as shown in FIGS. 6 to 9, the present method provides approximately a 3 dB improvement over the prior-art method.

The embodiments of the present invention therefore provide an initial ranging detector capable of detecting transmissions at very low signal to noise ratios (SNR) in a wide variety of channel conditions. This ability to detect the transmissions at very low SNR has several important benefits to the system. First, it allows the detection of mobile subscriber terminals at further distances from the base station (or in worse channel conditions). Second, it minimizes the amount of power required for the transmission of the initial ranging transmission by the mobile subscriber. The most important implication of this is that it minimizes the interference that the initial ranging transmission generates on the data transmissions of other users. This interference to the data transmissions can be substantial as the initial ranging transmissions are asynchronous to the data transmissions and thus generate inter-carrier interference (ICI) to the data sub-carriers. By reducing the amount of interference the initial ranging presents to the data sub-carriers the system may achieve a higher system capacity, and/or achieve better coverage. Finally, the performance of this method enables correct detection of the range with fewer re-tries leading to a quicker system access for a mobile subscriber and less interference from re-try attempts.

The embodiments of the invention described above are intended to be exemplary only. Persons of ordinary skill in the art will readily appreciate that obvious variations and modifications can be made to the embodiments described herein that do not depart from the spirit and scope of the subject matter defined by the claims. The scope of the invention is therefore intended to be limited solely by the appended claims.

The invention claimed is:

1. A method of performing an initial ranging detection of an initial ranging transmission of a mobile subscriber in an orthogonal frequency division multiple access (OFDMA) wireless communication system, the method performed in an initial ranging detector and comprising steps of:
   removing data sub-carriers from samples of a received OFDMA signal in order to suppress effects of inter-carrier interference (ICI) between the data sub-carriers and initial ranging sub-carriers whereby resulting samples are free of ICI;
   coherently summing the resulting samples to boost signal energy; and
   applying a sliding window Fast Fourier Transform (FFT) to the coherently summed samples and correlating each result of the sliding window FFT with each one of a set of predetermined codes.

2. The method as claimed in claim 1 wherein the step of removing the data sub-carriers comprises steps of:
   removing, in the time domain, a cyclic prefix from the samples of the received OFDMA signal;
   performing an FFT to transform the samples from the time-domain into a frequency-domain signal having initial ranging sub-carriers and data sub-carriers;
   zeroing the initial ranging sub-carriers to create a suppressed frequency-domain signal;
   performing an IFFT to transform the suppressed frequency-domain signal having only data sub-carriers to an equivalent suppressed time-domain signal;
   adding the cyclic prefix to the suppressed time-domain signal to create a set of suppressed samples wherein all effects of the initial ranging sub-carriers are suppressed; and
   subtracting the suppressed samples from buffered samples of the received signal to generate a set of new samples that are free of inter-carrier interference.

3. The method as claimed in claim 2 wherein the step of coherently summing samples to boost signal energy comprises a step of performing a vector addition in the complex plane of corresponding sample values that are offset by the periodicity in the signal.

4. The method as claimed in claim 2 wherein the step of applying the sliding window FFT comprises a step of recursively calculating the FFT by advancing a single sample at a time after having initially calculated a first complete FFT.

5. The method as claimed in claim 1 wherein the step of coherently summing samples to boost signal energy comprises a step of performing a vector addition in the complex plane of corresponding sample values that are offset by the periodicity in the signal.

6. The method as claimed in claim 5 wherein the step of applying the sliding window FFT comprises a step of recursively calculating the FFT by advancing a single sample at a time after having initially calculated a first complete FFT.

7. The method as claimed in claim 1 wherein the step of applying the sliding window FFT comprises a step of recursively calculating the FFT by advancing a single sample at a time after having initially calculated a first complete FFT.

8. The method as claimed in claim 1 wherein a set of samples having a length equal to 3 OFDMA symbols are coherently summed to form a set of coherently summed samples having a length equal to 1.5 OFDMA symbols by offsetting a parallel-stream copy of the samples by the periodicity in the signal.

9. The method as claimed in claim 1 wherein the step of removing data sub-carriers is performed at a base station.

10. An initial ranging detector for detecting an initial ranging transmission of a mobile subscriber in an orthogonal frequency division multiple access (OFDMA) wireless communication system, the initial ranging detector comprising:
   a buffer for receiving and storing samples of a received OFDMA signal;
   a processing module for processing the samples to suppress effects of inter-carrier interference (ICI) between data sub-carriers and initial ranging sub-carriers and for subtracting the processed samples from the stored samples to generate a new set of samples wherein ICI is suppressed;
   a coherent summation block for coherently summing the new samples to boost signal energy; and
   a search window module for performing a sliding window Fast Fourier Transform (FFT) on the new samples and for correlating results of the sliding window FFT with each one of a set of predetermined codes.

11. The initial ranging detector as claimed in claim 10 wherein the processing module is adapted to remove, in the time domain, a cyclic prefix from the samples of the received OFDMA signal, to perform an FFT to transform the samples from the time-domain into a frequency-domain signal having initial ranging sub-carriers and data sub-carriers, to zero the initial ranging sub-carriers to create a suppressed frequency-domain signal, to perform an IFFT to transform the suppressed frequency-domain signal having only data sub-carriers to an equivalent suppressed time-domain signal, and to add the cyclic prefix to the suppressed time-domain signal to create a set of suppressed samples wherein all effects of the initial ranging sub-carriers are suppressed.

12. The initial ranging detector as claimed in claim 10 wherein the coherent summation block comprises a delay block to introduce a delay equal to a size of the FFT in order to coherently align the new samples with a parallel-stream copy of the new samples offset by the periodicity of the signal.

13. The initial ranging detector as claimed in claim 10 wherein the processing module comprises a first filter for removing the cyclic prefix from the samples of the received OFDMA signal, a second filter for performing an FFT to transform the samples into a frequency-domain signal having initial ranging sub-carriers and data sub-carriers, a third filter for zeroing the initial ranging sub-carriers to create a suppressed frequency-domain signal, a fourth filter for performing an IFFT to transform the suppressed frequency-domain signal having only data sub-carriers to an equivalent suppressed time-domain signal, and an adder to add the cyclic prefix to the suppressed time-domain signal to create a set of suppressed samples wherein all effects of the initial ranging sub-carriers are suppressed.

14. The initial ranging detector as claimed in claim 10 wherein the buffer receives and stores samples equal to 3 OFDMA symbols which are coherently summed to create new samples having a length equal to 1.5 OFDMA symbols and having double the signal energy.

15. The initial ranging detector as claimed in claim 10 wherein the sliding window FFT is adapted to first calculate a complete, initial FFT and to recursively calculate each subsequent FFT while advancing one sample at a time.

* * * * *

UNITED STATES PATENT AND TRADEMARK OFFICE
CERTIFICATE OF CORRECTION

PATENT NO. : 7,586,976 B1
APPLICATION NO. : 11/366387
DATED : September 8, 2009
INVENTOR(S) : Jason Duggan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Twenty-first Day of September, 2010

David J. Kappos
*Director of the United States Patent and Trademark Office*